F. R. McBERTY.
CABLE AND METHOD OF FORMING AND CONNECTING THE SAME.
APPLICATION FILED FEB. 27, 1908.
1,104,061. Patented July 21, 1914.
3 SHEETS—SHEET 3.
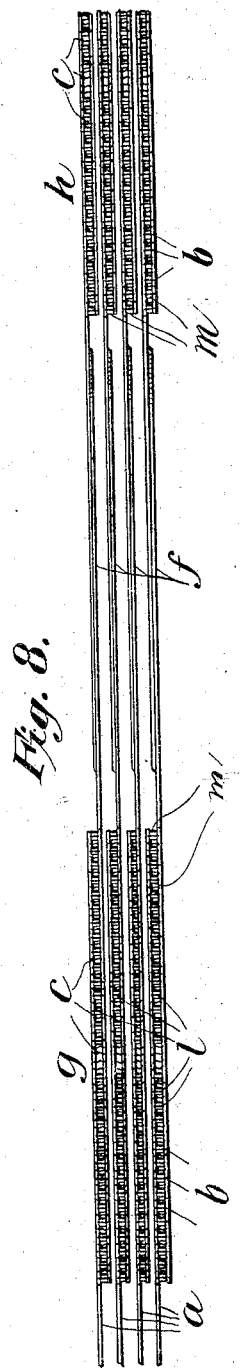
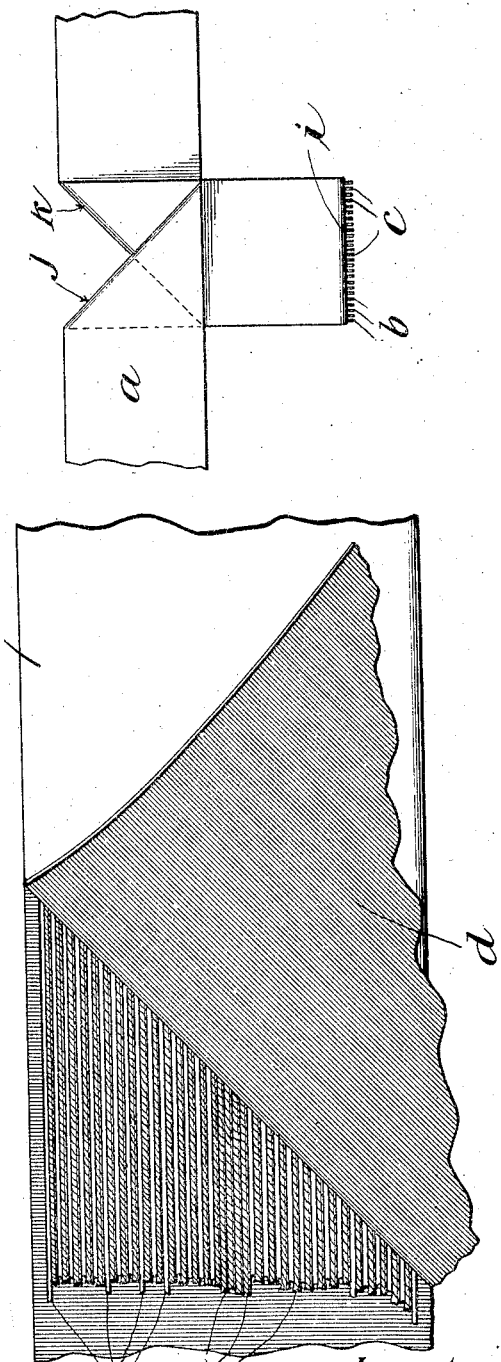

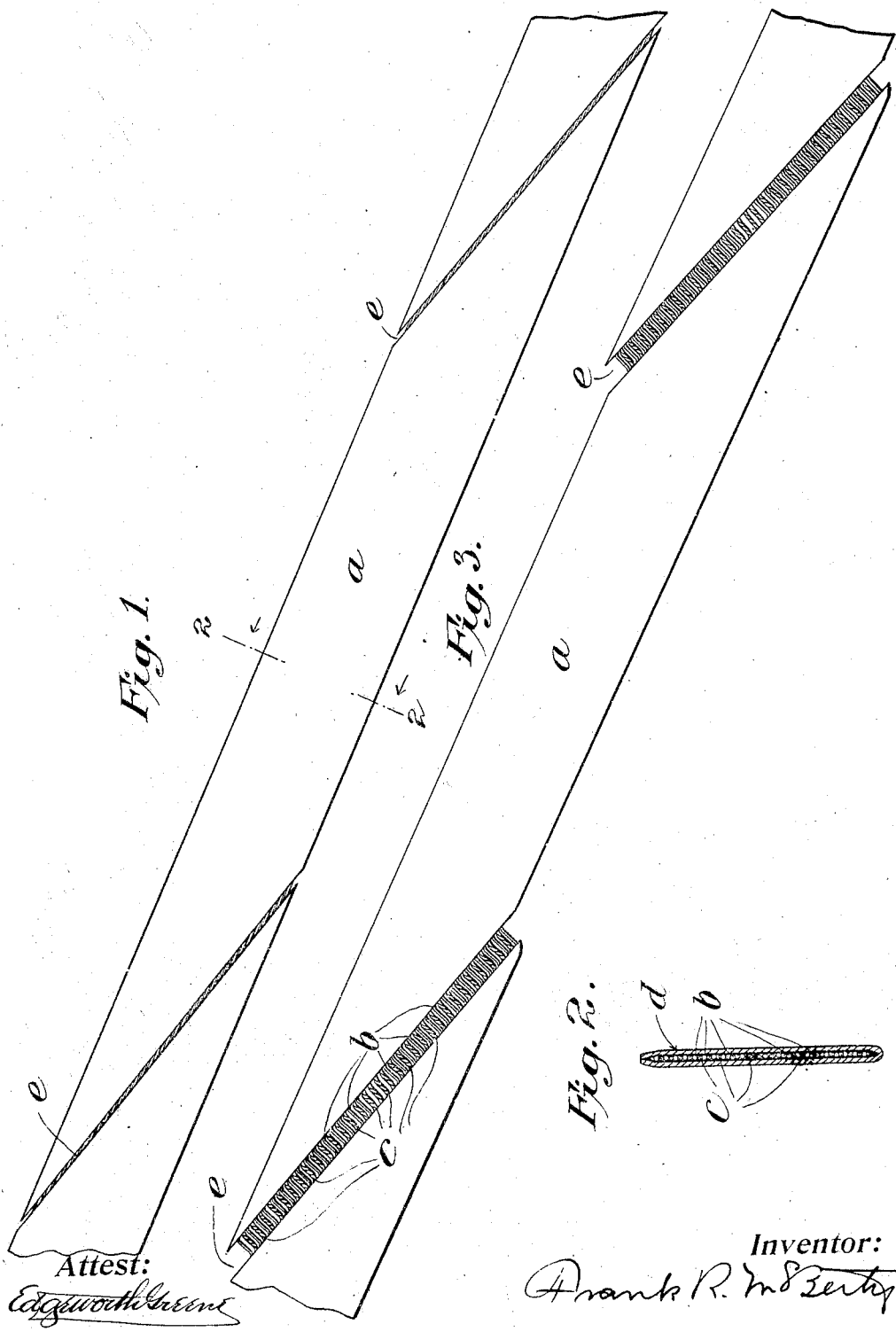

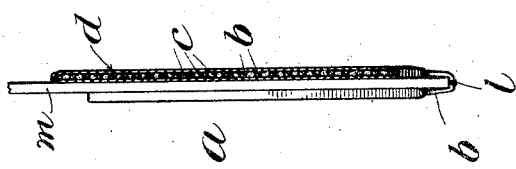
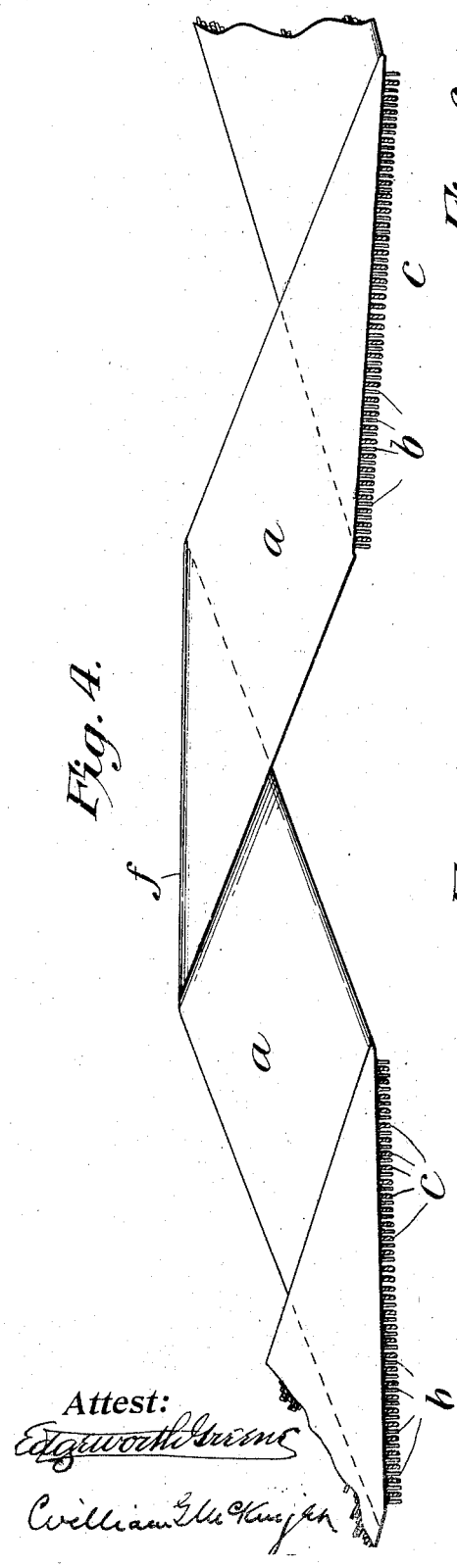
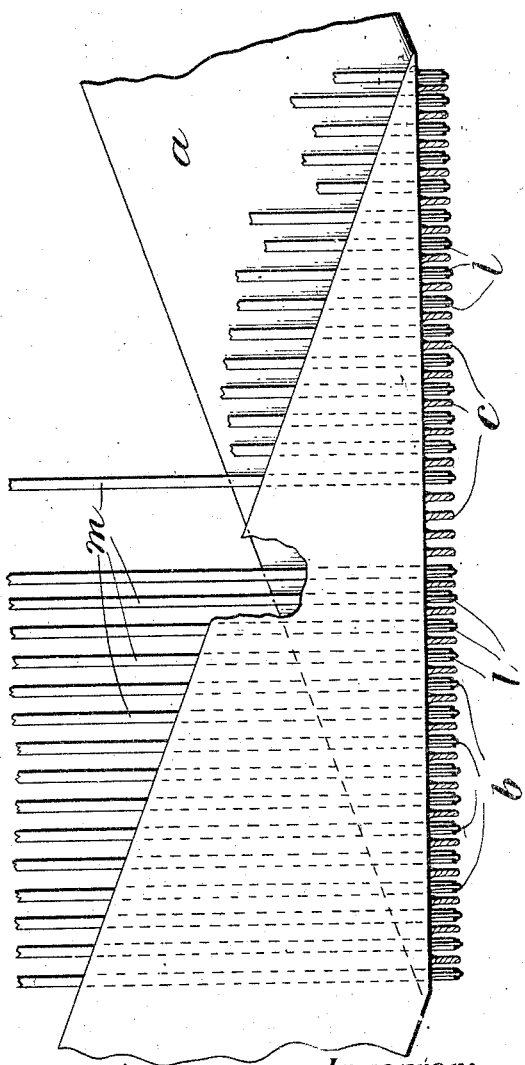

UNITED STATES PATENT OFFICE.

FRANK R. McBERTY, OF NEW ROCHELLE, NEW YORK, ASSIGNOR TO WESTERN ELECTRIC COMPANY, OF CHICAGO, ILLINOIS, A CORPORATION OF ILLINOIS.

CABLE AND METHOD OF FORMING AND CONNECTING THE SAME.

1,104,061.   Specification of Letters Patent.   Patented July 21, 1914.

Application filed February 27, 1908. Serial No. 418,128.

*To all whom it may concern:*

Be it known that I, FRANK R. McBERTY, a citizen of the United States, residing in the town of New Rochelle, in the county of Westchester and State of New York, have invented a certain new and useful Improvement in Cables and Methods of Forming and Connecting the Same, of which the following is a full, clear, concise, and exact description.

My invention relates to a cable particularly adapted for use in making connection with electrical apparatus requiring the employment of a large number of closely spaced terminals, and to the method of forming cables of this character and of connecting the same with the terminals that they are adapted electrically to unite.

My invention is directed primarily toward the provision of a cable which will require the minimum amount of material and labor in making and forming the same, and which will therefore be particularly inexpensive to manufacture; and at the same time will be electrically and mechanically efficient and not liable to derangement.

The cable of my invention is particularly adapted to be employed in connecting together the terminals of groups of switches such as are commonly employed in telephone systems of the present day, and in which it is necessary to connect a series of terminals in multiple upon each of the conductors of the connecting cables. It is customary in connecting groups of terminals in multiple by means of cables to extend the cables past the terminals at some little distance therefrom, and to form the connection between the cable and the terminals by separating the cable into its several wires at the point where the connection to the group of terminals is to be made, and by leading each wire individually to its corresponding terminal at the group. This method of forming the connection between the cable and the group of terminals entails breaking up the cable, manipulating each of the wires individually, and providing a considerable length of wire between the cable and the terminals in order to permit a certain movement between the cable and the group of terminals to render the connection therewith accessible for alteration or repair.

In accordance with my invention I employ a cable so constructed as to be capable of having its individual wires brought into direct connection with the corresponding terminals of the group without any individual manipulation of the wires whatever, and without requiring any more wire to complete the connection with the terminals that is contained in the straight length of the cable employed. Furthermore, in accordance with my invention the cables are so constructed and arranged with respect to the terminals with which they are adapted to be connected that they may be located within the point of connection of their wires with the terminals, to render the connections freely accessible and entirely unobstructed. This result I secure by employing cables in the form of flat ribbons of insulated wire, the ribbons being thin enough to lie between adjacent rows of terminals and, except for the points of connection of their wires with the terminals, entirely within the plane of the outer ends of the terminals, or in other words, to the rear of said outer ends of the terminals. At the points where the conductors of the cables are to be joined to the corresponding terminals, the conductors are brought into contact with the terminals preferably by folding the cable upon itself so that the edge of the fold overlies the tops of the terminals in the associated row. Inasmuch as the cables are ordinarily narrower than the length of the rows of terminals with which their conductors are to be connected, the direct connection between the conductors and the corresponding terminals of the row is preferably accomplished by folding the cable along a line oblique to the length of the cable, the obliquity of the fold being dependent upon the relation between the width of the cable and the length of the line of terminals with which the conductors of the cable are to be connected. The insulating covering of the wires of the cable is discontinued or removed at the line of the fold, so that the bare conductors are exposed for connection with the ends of the terminals. The sections of the cable on opposite sides of the line at which the insulation is removed are also preferably displaced with relation to each other to bring the bared portions of the wires into a substantially right angle relation with the oblique line of the fold, so that the bared portions extend directly across the ends of the terminals.

I shall describe the novel features of my invention more particularly hereinafter by reference to the drawings, wherein—

Figure 1 illustrates a length of one form of cable embodying my invention; Fig. 2, a cross section of the cable on line 2—2 of Fig. 1; Fig. 3, the cable shown in Fig. 1 with the sections of the cable on opposite sides of each of the oblique exposed portions displaced to open out the conductors for connection; Fig. 4, the cable folded upon itself along the lines of the exposed portions, and at intermediate points to bring the exposed portions into the same line; Fig. 5, the connection of the wires of the cable at one of its exposed portions to a row of terminals; Fig. 6, an end view of the arrangement illustrated in Fig. 5 looking in the direction of the arrow; Fig. 7, an enlarged detailed view of the interior construction of this form of the cable; Fig. 8, a plan view of several groups of terminals connected by cables in accordance with my invention; and Fig. 9, a view of a modified manner of connecting the cable with a group of terminals.

In describing my invention by reference to the drawings, I shall employ the same reference character to designate the same part in the different figures.

The cable $a$ of my invention, in the form in which I prefer to employ it, comprises a plurality of wires or conductors $b$ arranged in a single layer and separated by means of a series of interposed threads $c$ of insulating material. The wires and threads may be of any suitable material and dimensions. In constructing certain cables in accordance with my invention, I have found it convenient to employ tinned copper wires of No. 26 or No. 28 gage, and No. 25 spool cotton for the interposed insulating threads. The series of wires $b$ with their interposed insulating threads $c$ are insulated and held in place by an outer covering or serving $d$ of insulating material. This covering may be of cloth—muslin, for instance—or fabric of any suitable material and form, applied to the wires in any convenient manner. If a strip of cloth is used as the covering, as illustrated, it may conveniently be slightly more than twice as wide as the width of the layer of wires and their interposed threads, so that the wires and threads may be laid along one-half of the width of the covering strip $d$, and the other half folded over them, as illustrated in Figs. 2 and 7.

In constructing the cable, the insulation of the wires is discontinued at intervals, depending upon the distance between the groups of terminals with which the cable is to be connected, in order to expose the wires of the cable for connection. This may conveniently be accomplished, as indicated in Figs. 1 and 3 of the drawings, by forming the outer covering or serving of the cable in sections and leaving a small space $e$ between the edges of adjoining sections. When the exposed portions are produced in this manner, the sections of fabric that constitute the outer covering or serving $d$ of the cable are cut in somewhat the form of arrow heads, the sections laid in a continuous line with the point of one section fitting into the hollow of the next section with a slight space between, the wires with their interposed insulating threads are extended along one-half of the width of the series of covering sections, and the other half then folded over to inclose the wires and form the cable. Or, if desired, the insulating covering of the wires may be made continuous, and may then be removed along the predetermined line in any convenient manner,— as by passing a hot iron over the insulation along the line at which the wires are to be bared. Or the discontinuity of the insulation of the conductors along the predetermined line may be effected in the process of applying insulating threads and fabric to form the cable.

In order to secure the parts of the cable of my invention firmly together, I preferably apply a binder or cement of some sort to the wires, the insulating covering and separating threads in the process of assembling them. I have found that the substance known as "tailors glue", which comes in very thin sheets that may be laid between the wires and outer covering and melted with a hot iron after the covering is folded upon the wires, serves this purpose well. I have also employed for this purpose shellac varnish applied to the wires before the outer covering is folded upon them. In preparing the cable thus constructed for application to and connection with the terminals of electrical apparatus with which it is adapted to be used, the cable is folded upon itself along the line of the exposed portions $e$ of the wires, so as to produce terminal projections of the wires of the cable at these points. The proper angle for the exposed portions $e$ with respect to the length and width of the cable is determined by the relation between the width of the cable and the length of the row of terminals with which the wires of the cable are to be connected. A straight line of a length equal to the length of the row of terminals, laid off upon the cable with its extremities coinciding with the two outer wires of the ribbon has the proper angular relation to the length of the cable, so that if the wires are exposed and the cable folded along this line each wire of the cable will pass over the corresponding terminal of the row of terminals. In order that each wire may pass straight across its corresponding terminal, and in order that the wires at the fold may be in more open relation with respect to each other, I preferably displace the two sections of the cable on opposite sides of the exposed line e, so that the bare wires will cross the open space substantially at right angles, preferably, to the line along which the insulation is removed. This displacement of the sections of the cable is clearly illustrated in Fig. 3. Then, by folding the cable along a line extending approximately through the center of the exposed portion of the wires, and by introducing an intermediate fold f into the cable to bring the projecting edges of the exposed portions into substantially the same straight line, an arrangement is produced, as illustrated in Fig. 4, wherein the wires of the cable are in position to be directly connected with the corresponding terminals. It will be observed that by constructing a cable in the manner illustrated and described, the wires of the cable are brought out for connection without requiring any individual manipulation of the wires, and without requiring that the wires shall be of a length in excess of the length of the cable itself.

After the cable is formed, as has been described, it is possible to connect it to the terminals that it is adapted to unite by carrying it along behind the projecting terminals with the exposed terminal portions of the wires of the cable touching the outer extremities of the rows of terminals and secured thereto by soldering. But the extreme thinness of the ribbon cable of my invention makes it possible to place the cable in position between the adjacent rows of terminals so that the cable lies entirely within the plane of the outer extremities of the terminals, and this is the arrangement which I prefer to employ. This manner of associating the cables with the groups of terminals is illustrated in Figs. 5, 6 and 8 of the drawings, by reference to which it may be seen that the soldered connections l between the wires of the cables and the extremities of the projecting terminals m are readily accessible and are in no way obstructed by the cable themselves; and that the cables are held firmly between the terminals and protected from injury. The terminals m, to the outer projecting ends of which the wires of the cable are connected, consist of rods or wires, preferably of rectangular cross-section, as illustrated. The inner ends thereof, broken away in the drawings, may, for example, be disposed to be engaged by a movable contact member of a switch of a type, which, as before stated, is commonly employed in telephone systems of the present day. In attaching the cable to a row of terminals m, I prefer to fold the cable over the top of the row of terminals so that the top of each terminal lies within the loop of its corresponding wire, as illustrated in Fig. 5. It is obvious, however, that the folded cable may be extended along one side of the row of terminals so that the projecting exposed portions of the cable wires will lie in contact with and be secured to one side of the associated terminals. The arrangement of the cables where a number of them are used to connect a plurality of closely spaced rows of terminals located in different groups is illustrated in Fig. 8. Each cable a extends to one side of its particular row of terminals in the group g, is folded over the same to bring the exposed portions of its wires into contact with the ends of the terminals, and then extends to another group of terminals h over the corresponding row of which it is folded and to which its wires are secured in the same manner as in the first group. This process may be repeated as many times as there are groups of terminals to which the cable is to be connected.

Inasmuch as folding the cable to bring its wires across the top of a row of terminals alters its direction in such a manner as to carry it away from the next group with which it is to be connected, one or more intermediate folds, as illustrated at f in Figs. 4 and 8, are introduced into the cable to bring it into position to connect with the next row of terminals. Fig. 9 illustrates a modification in which the cable is folded and the wires exposed on a line i at right angles to the length of the cable, and in which two intermediate folds j and k are introduced in the cable at each group of terminals with which it is connected in order to bring it into position to be folded at right angles over the next row of terminals to which it extends. In this modification the width of the flat cable a is approximately equal to the length of the row of terminals to which the wires of the cable are connected.

I claim:

1. A multi-conductor cable comprising a ribbon of insulated wires, the insulation of the wires being made discontinuous along a line oblique to the length of the cable, and the two sections of the cable on opposite sides of the oblique uninsulated line being displaced laterally with respect to each other.

2. A multi-conductor cable consisting of a ribbon of insulated wires having the insulation removed therefrom along a line oblique to the length of the cable, the two sections of the cable on opposite sides of the oblique line being displaced to bend the uninsulated portions of the wires of the cable substantially at right angles to said oblique line, and the cable being folded on itself along the oblique line to produce terminal projections of the wires.

3. The method of bringing the wires of a flat cable out for connection without individually handling the same, which consists in making discontinuous the insulation of the wires along a line oblique to the length of the cable, displacing with respect to each other the sections of the cable on opposite sides of the oblique line to bend the bared portions of the wires substantially at right angles to said line, and folding the cable upon itself along the oblique uninsulated line.

4. A multi-conductor cable comprising a ribbon of wires, insulating fabric secured to the opposite sides of said ribbon, said fabric being made discontinuous along a line oblique to the length of the cable and the sections of the cable on opposite sides of the oblique uninsulated line being displaced laterally with respect to each other.

5. A multi-conductor cable consisting of a ribbon of wires inclosed by insulating fabric, said fabric being discontinuous along a line oblique to the length of the cable, the sections of the cable on the opposite sides of the oblique line being displaced to bend the uninsulated portion of the wires of the cable substantially at right angles to said oblique line, and the cable being folded on itself along the oblique line to produce terminal projections of the wires.

6. The method of forming a flat cable consisting in securing a plurality of longitudinally extending conductors between sheets of insulating fabric, making the insulating fabric discontinuous at intervals to bare the conductors along lines oblique to the length of the cable and displacing with respect to each other in the plane thereof the sections of the cable on opposite sides of said transverse lines to separate the wires for connection.

FRANK R. McBERTY.

Witnesses:
  NICHOLAS E. KERNAN,
  WILLIAM G. McKEIGLER.